United States Patent [19]
Rooney

[11] Patent Number: 5,401,079
[45] Date of Patent: Mar. 28, 1995

[54] HEAT TRANSFER PREVENTING LUG HOLE SLEEVE INSERTS FOR A PLASTIC WHEEL

[75] Inventor: Timothy M. Rooney, Munroe Falls, Ohio

[73] Assignee: The Goodyear Tire & Rubber Company, Akron, Ohio

[21] Appl. No.: 750,128

[22] Filed: Aug. 26, 1991

[51] Int. Cl.⁶ .................................. B62B 5/02
[52] U.S. Cl. .................. 301/6.91; 301/64.7; 301/65
[58] Field of Search .............. 301/65, 6.1, 6.3, 9.1, 301/35.54, 35.62, 64.7; 188/264 G

[56] References Cited

U.S. PATENT DOCUMENTS

| | | |
|---|---|---|
| 3,659,901 | 5/1972 | Porsche et al. ........... 301/65 |
| 3,664,708 | 5/1972 | Verdier ................ 301/9 DN |
| 3,746,399 | 7/1973 | Verdier ................... 301/65 |
| 3,952,786 | 4/1976 | Kreling et al. . |
| 3,956,451 | 5/1976 | Adams . |
| 3,970,370 | 9/1976 | Bard . |
| 4,072,358 | 2/1978 | Ridha . |
| 4,294,490 | 10/1981 | Woelfel . |
| 4,314,964 | 2/1982 | Ferrary . |
| 4,511,184 | 4/1985 | Schauf et al. . |
| 4,636,344 | 1/1987 | McDougall . |
| 4,666,215 | 5/1987 | Toms, Jr. . |
| 4,702,527 | 10/1987 | Kawano .............. 301/64.7 X |
| 4,786,027 | 11/1988 | Stalter, Sr. . |
| 4,861,538 | 8/1989 | Stalter, Sr. . |
| 4,896,922 | 1/1990 | Güthe . |
| 4,900,097 | 2/1990 | Kostov et al. ......... 301/6 WB X |
| 4,982,990 | 1/1991 | Bongers et al. . |
| 5,026,122 | 6/1991 | Grubisic et al. .......... 301/9 DN |

FOREIGN PATENT DOCUMENTS

| | | | |
|---|---|---|---|
| 829309 | 4/1939 | France ................ | 301/9 DN |
| 2248548 | 4/1973 | Germany ............. | 301/63 PW |
| 0209601 | 12/1983 | Japan ................. | 301/63 PW |
| 0067102 | 4/1984 | Japan ................. | 301/63 PW |
| 0195402 | 11/1984 | Japan ................. | 301/63 PW |
| 0082402 | 5/1985 | Japan ................. | 301/63 PW |
| 0128958 | 5/1990 | Japan ................. | 301/9 DN |
| 1052430 | 11/1983 | U.S.S.R. .............. | 301/63 PW |

*Primary Examiner*—Russell D. Stormer
*Attorney, Agent, or Firm*—David L. King

[57] ABSTRACT

A plastic wheel assembly (10) is described. The wheel (10) comprises a rim (12) and a disk (14). The disk (14) has holes (16) with inserted sleeves (20). The sleeves (20) extend through the disk (14) a sufficient distance to avoid excesssive heating of the plastic wheel (10) during normal use.

18 Claims, 4 Drawing Sheets

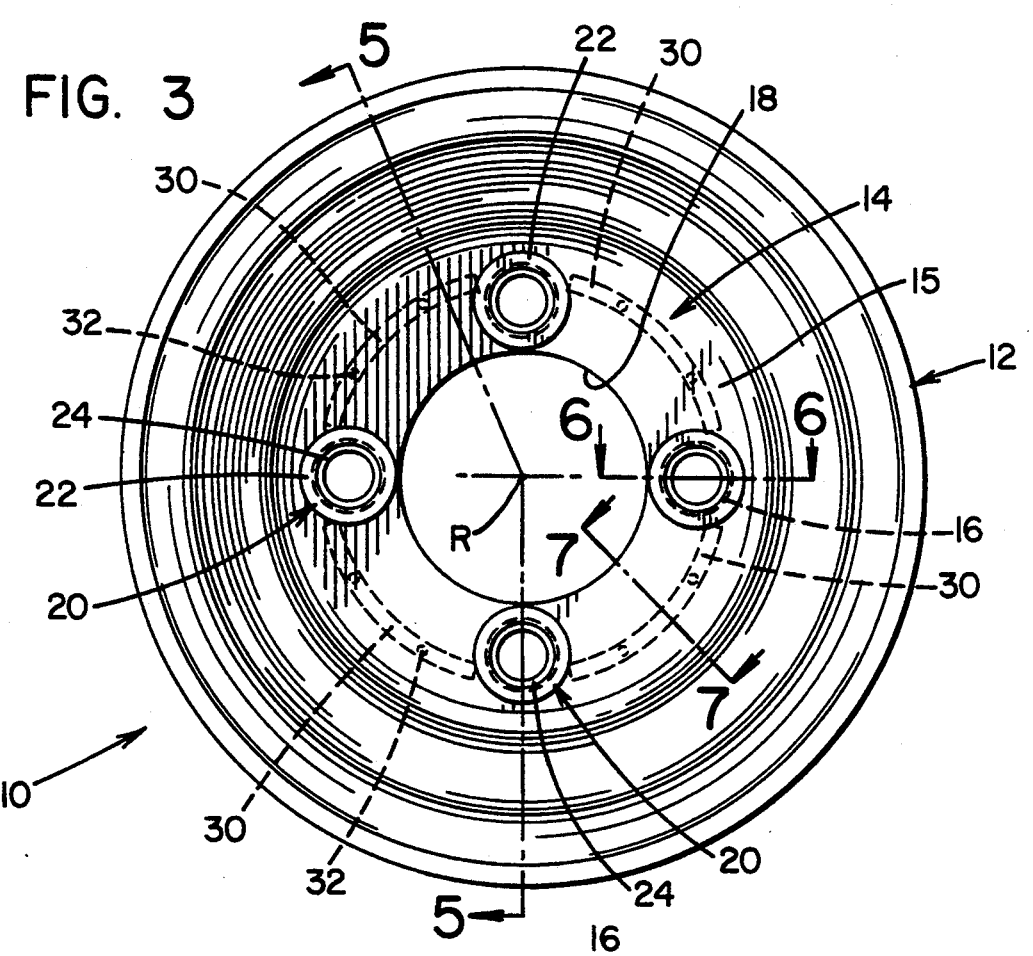
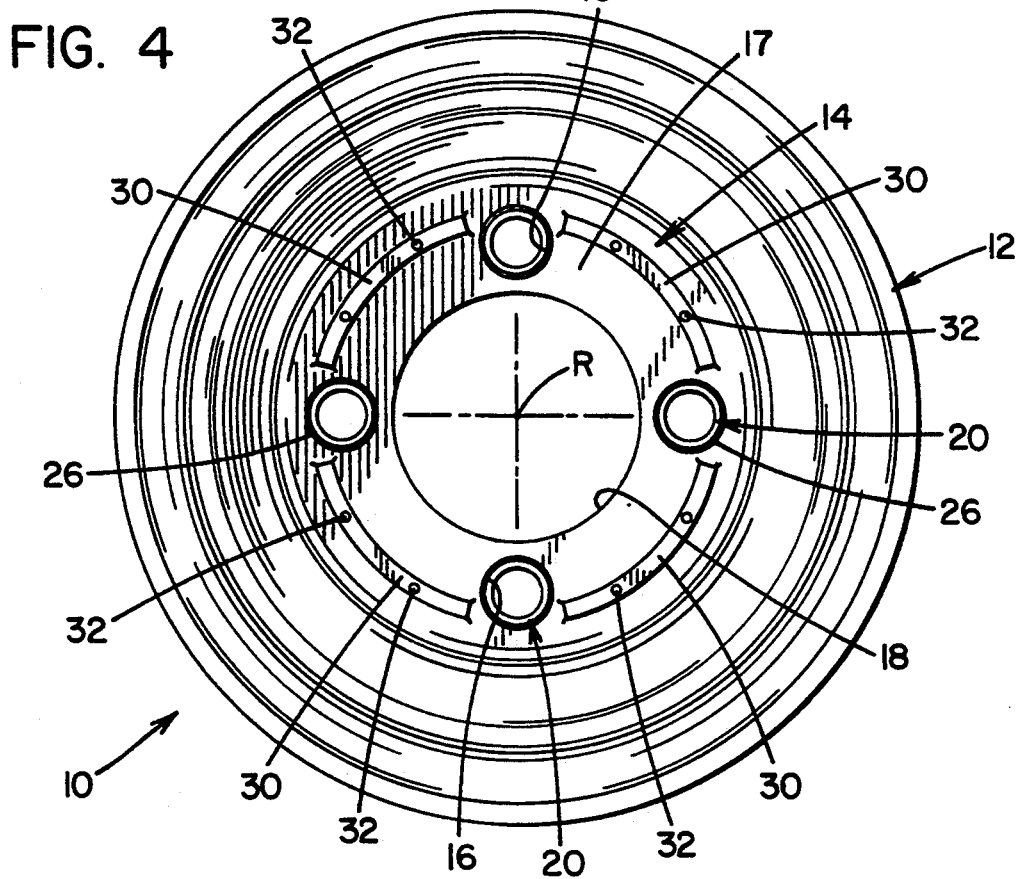

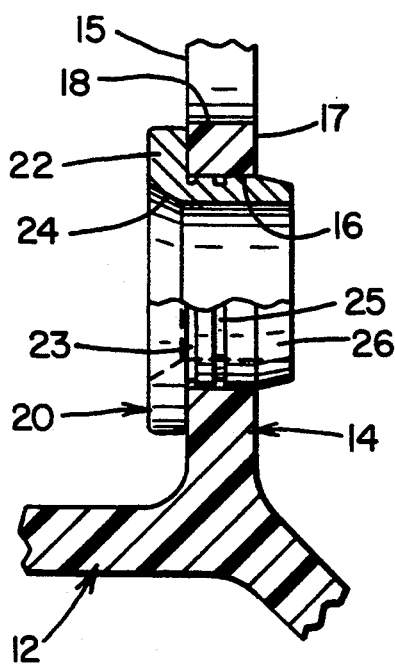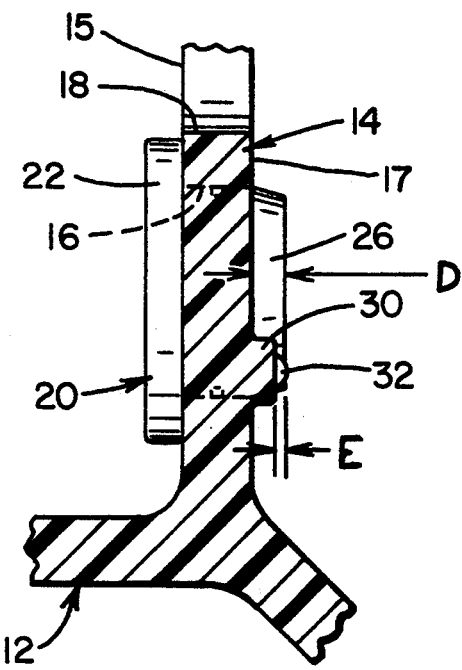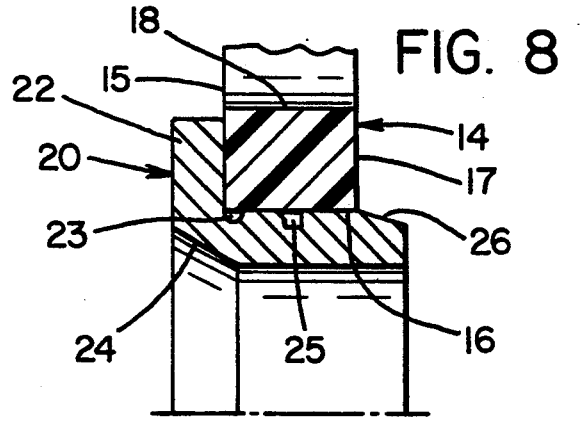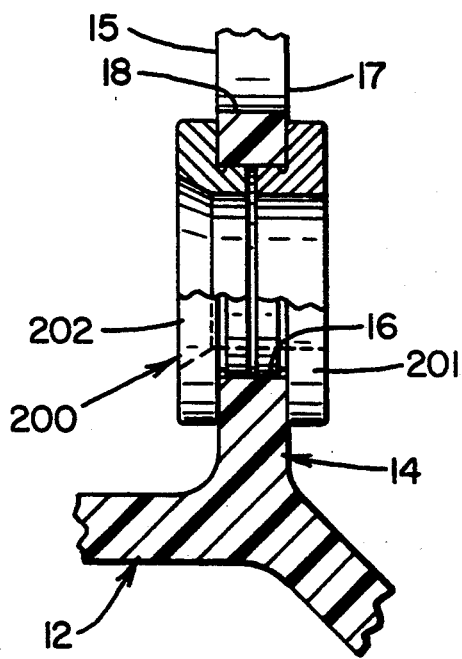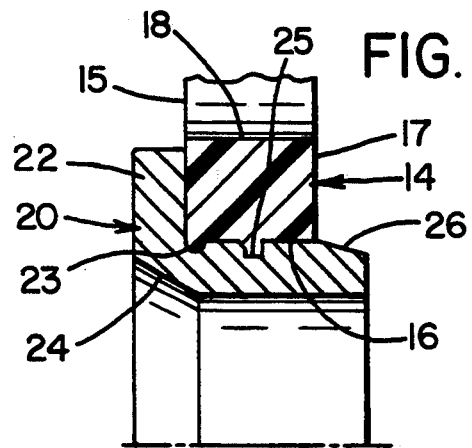

HEAT TRANSFER PREVENTING LUG HOLE SLEEVE INSERTS FOR A PLASTIC WHEEL

BACKGROUND OF THE INVENTION

The invention relates to a plastic wheel assembly particularly well suited for utility vehicles, more particularly for use on golf cars.

The conventional golf car is provided with metallic rims. The rim includes a pair of annular flanges adapted to engage the bead of a pneumatic tire, and a rim base interposed between the flanges. A disk extends radially inwardly from the base and is adapted to fit over the studs of the golf car hub.

The disk is approximately axially centered between the bead flanges. This position enables the disk to support the vehicle load with minimal eccentric or bending forces. This central location of the disk means that the vehicle hub is encased within the rim assembly.

The hub of a golf car includes a drum brake system, the inner surface of the hub being a drum brake surface. The hub under severe braking service can reach temperatures in excess of 400° F. and the hub being of cast iron tends to hold temperatures for relatively long periods of time.

These friction-generated high temperatures are not a problem for metal rims, but for a thermoplastic wheel such temperatures are design limiting. The in-service temperatures are so high that most engineering plastics cannot be used as these materials melt or lose physical properties at these operating temperatures.

The present invention overcomes the high heat problems associated with the vehicle hub while at the same time permitting the use of rather conventional thermoplastic resins.

The present invention is easily adapted to current vehicle wheel designs and is fully interchangeable with the prior art metal wheel assemblies.

SUMMARY OF THE INVENTION

The plastic wheel assembly of the invention comprises a rim and a disk. The disk is integrally attached to the rim and extends radially inwardly from the rim. The disk has a plurality of holes with inserted sleeves. The holes with sleeves are aligned for attachment to a vehicle hub. The sleeves extend axially inwardly through the disk, the sleeve contacting the vehicle hub upon assembly causing a spacing of the disk and rim portions of the wheel from direct contact with the hub a distance sufficient to avoid excessive heating of the plastic wheel during normal wheel use.

In one embodiment of the invention the sleeves are metal, preferably steel. The sleeves have a conically tapered inner surface at one end and may also have a flange.

In a preferred embodiment the disk, at an axially inner side, has a plurality of projections. The projections extend a distance equal to or less than the distance of the sleeve's extension.

The sleeves extend such that upon assembly to a vehicle hub the plastic portions of the wheel are not in direct contact with the hub. The disk at an axially inner side has a majority of its surface area spaced from the hub. The sleeves extend axially beyond the majority of the surface area of the inner side of the disk a distance D between 1.0 to 6.0 mm, preferably, 2.5 mm.

The spacing of the plastic wheel from the hub creates an air gap that insulates the disk from the hub and also enhances cooling by convective heat transfer. The disk includes a large central opening which enables the heated air to escape to ambient air.

BRIEF DESCRIPTION OF THE DRAWINGS

FIG. 3 is a plan view of the outer end of the wheel.

FIG. 4 is a plan view of the inner end of the wheel.

FIG. 6 is an enlarged cross-sectional view of a portion of the wheel taken along lines 6—6 of FIG. 3 illustrating the inserted sleeve.

FIG. 7 is an enlarged cross-sectional view of a portion of the wheel taken along lines 7—7 and the view illustrates a projection extending from the inner side of the disk.

FIG. 8 is an enlarged cross-sectional view of a portion of the sleeve and wheel as illustrated in FIG. 6, the view illustrating assembly of the sleeve press fit to the wheel disk.

FIG. 8A is an enlarged view similar to FIG. 8 wherein the sleeve is insert molded into the disk.

FIG. 9 is an enlarged cross-sectional view of an alternative embodiment of the wheel wherein the sleeve comprises two separate flanged components.

DEFINITIONS

"Axial" and "axially" to refer to lines or directions that are parallel to the axis of rotation of the wheel assembly.

"Radial" and "radially" refer to directions radially toward or away from the axis of rotation of the wheel assembly.

"Circumferential" means lines or directions extending along the perimeter of the surface of the annular rim perpendicular to the axial direction.

"Innerside" means that portion of side of the wheel assembly adjacent to or closest to a vehicle chassis or centerline.

"Outerside" means that portion or side of the wheel assembly that faces outward relative to a vehicle chassis or centerline.

DETAILED DESCRIPTION OF THE INVENTION

Figure 1:
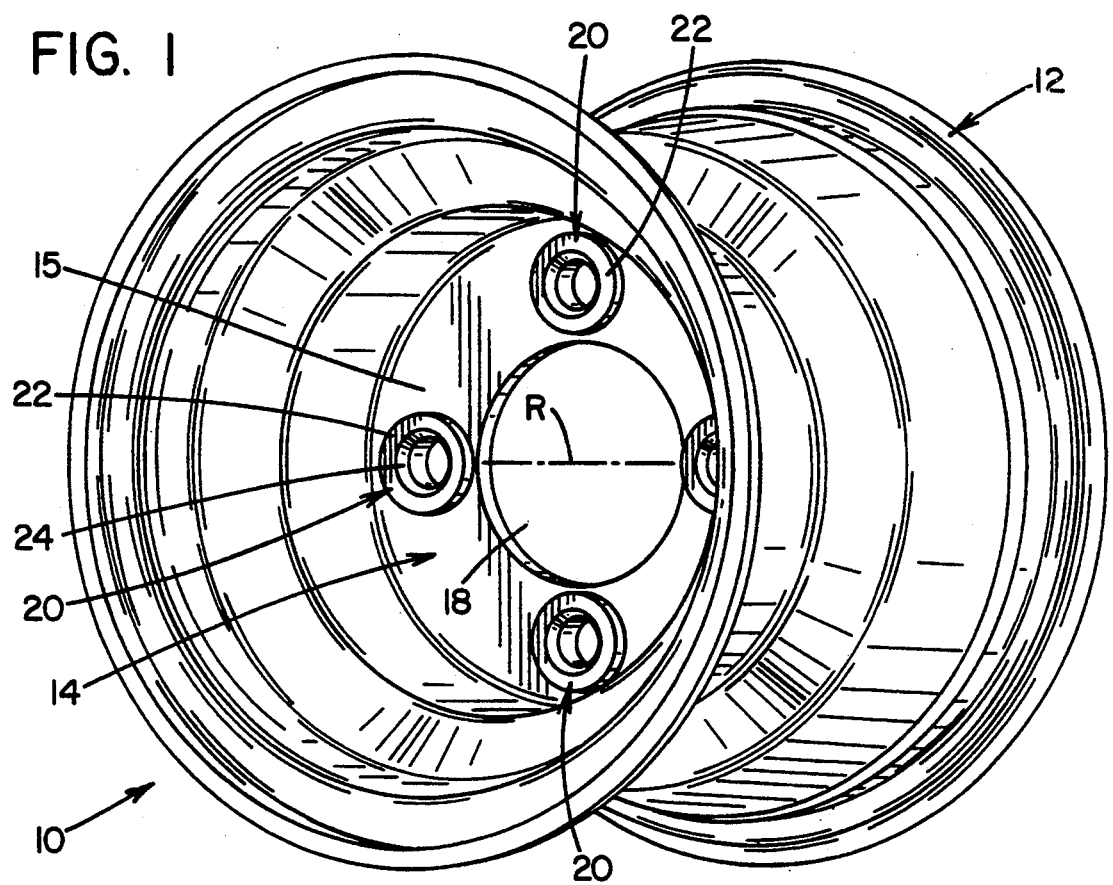
FIG. 1 is a perspective view of the plastic wheel looking at the outer end of the wheel.

With reference to FIG. 1 there is illustrated a preferred embodiment of a plastic wheel assembly shown generally at reference numeral 10. The wheel assembly 10 of the present invention includes an annular rim 12 and a disk 14. The disk 14 is integrally attached to the rim and extends radially inward toward the axis of rotation R of the wheel assembly 10. The disk 14 has a plurality of holes 16 and a large central opening 18. In each of the holes 16 a sleeve 20 is inserted. The disk 14 is shown with it's outside surface or outerside 15 being the side of the disk facing away from a vehicle when the wheel is attached to it.

Figure 2:
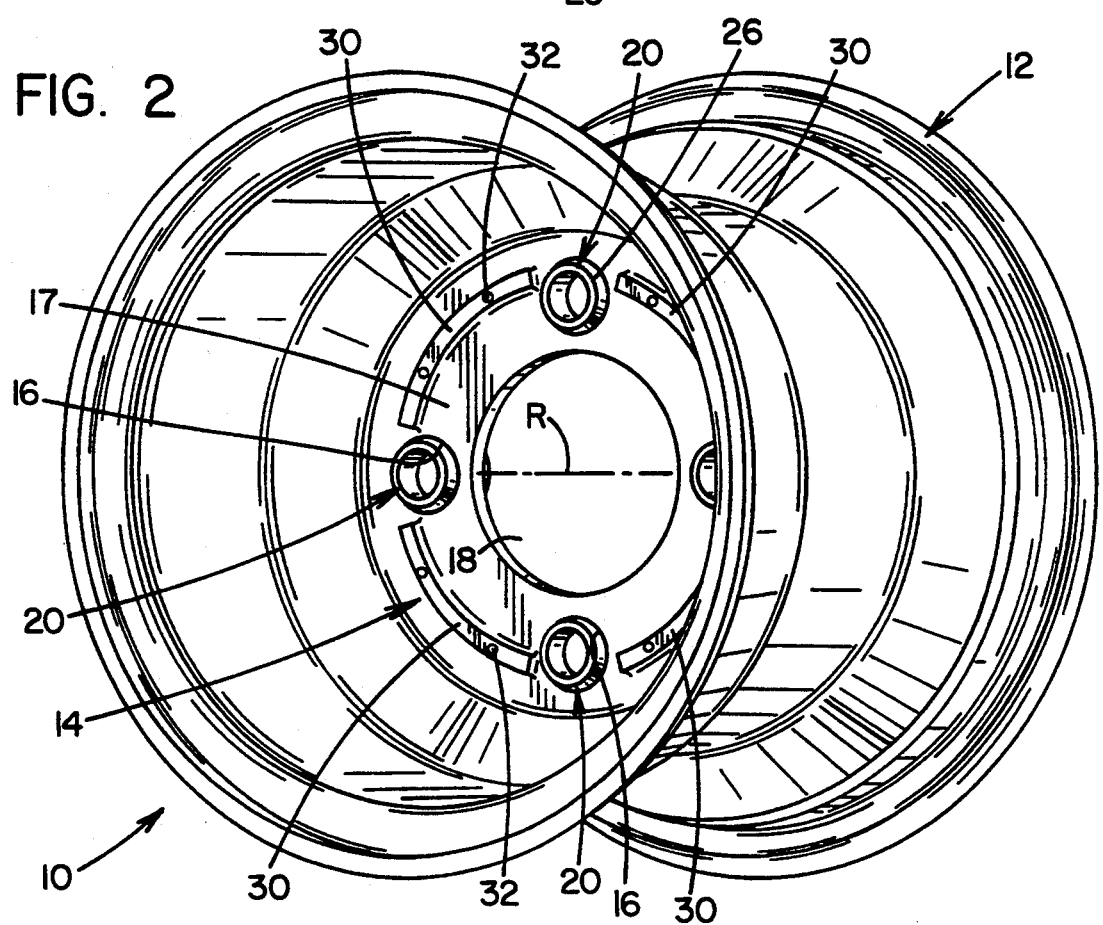
FIG. 2 is a perspective view of the plastic wheel looking at the inner end of the wheel.

In FIG. 2 there is illustrated a perspective view of the innerside of the wheel assembly 10. As illustrated the disk 14 has an innerside 17. The sleeves 20 extend beyond the innerside 17 a distance sufficient to prevent the plastic wheel assembly from being damaged or otherwise failing-during normal wheel operating conditions.

The innerside 17 of the illustrated embodiment has a plurality of projections 30 extending axially from the surface of the innerside 17. The projections are integrally attached to the disk 14. As can be observed from the perspective view, the projections 30 are arcuately shaped and a projection 30 is placed between each hole 16 at a radial distance slightly greater than the radial spacing of the holes 16.

Each projection 30 may include a plurality of protrusions as shown at 32. In the preferred embodiment the protrusions 32 extend axially from the projection. The projection and protrusion combined extend a distance equal to the full extension of the sleeves 20 beyond the innerside 17 of the disk 14. The protrusions 32 facilitate assembly of the sleeves 20 to the wheel and serve no other purpose.

FIGS. 3 and 4 are plan views looking into the outerside and the innerside of the wheel assembly, respectively.

As can be observed from FIG. 3 the sleeve 20 may be provided with a flange 22. Additionally the sleeve 20 may include a conically tapered surface 24 on the inside diameter of the sleeve.

From FIG. 4 it can be observed that the sleeve 20 may have a chamfered outer surface 26. The chamfered surface facilitates insertion of the sleeves 20 in the holes 16 of the disk 14.

Figure 5:
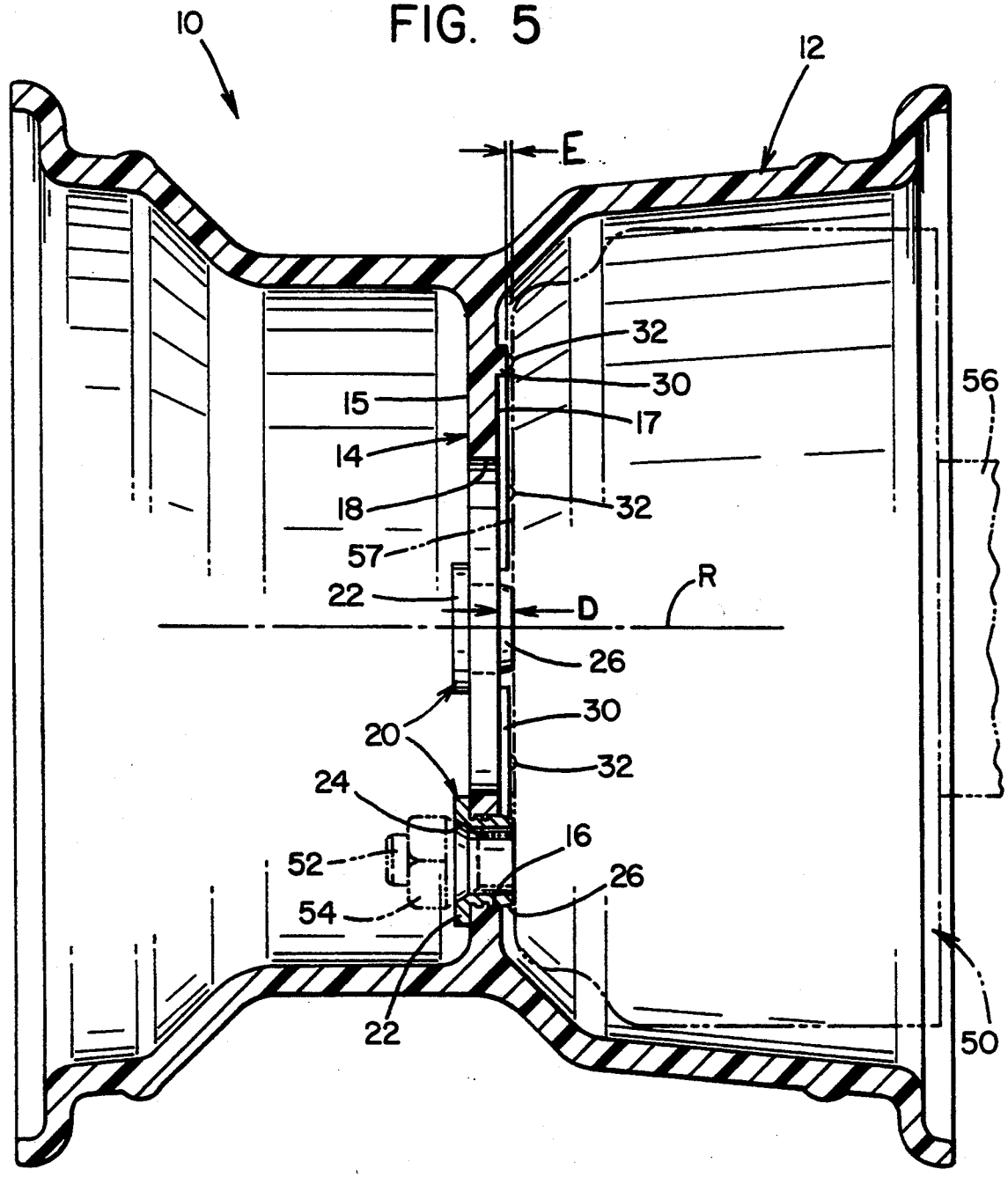
FIG. 5 is a cross-sectional view of the wheel taken along lines 5—5 of FIG. 3.

FIG. 5 illustrates a cross-sectional view of a preferred embodiment of the plastic wheel assembly 10 attached to a vehicle hub 50, the hub 50 being shown in dashed lines. The vehicle hub 50 extends from the vehicle axle 56. The wheel assembly 10 is secured to the hub by a plurality of threaded studs 52, which extend from the hub, and conically tapered nuts 54. The studs 52 extend through the sleeves 20. It is recommended that the sleeve opening be larger than the stud 52. As the nut 54 is torqued down and tightened the conical taper of the nut 54, in combination with the conically tapered surface of the sleeve, centers the stud such that the stud normally is not in direct contact with the sleeve 20 along its inside diameter.

The sleeve 20 upon tightening of the nut 54 is firmly pressed against the hub face 57. The end of the sleeve bearing on the hub face 57 is substantially the only surface in contact with the hub 50. The only exception is the optional assembly protrusions 32, which under normal use are permitted to melt.

As can be observed from FIG. 5 the extension of the sleeve 20 beyond the innerside 17 of the disk 14 spaces the majority of the surface area of the disk 14 a specific distance D from the hub 50. The distance of this gap is recommended to be 1.0 to 6.0 min. The limiting factor as to greater dimensions is the amount of thread engagement available between the nut 54 and the stud 52. In the preferred embodiment the distance was set at 2.5 mm.

The projection 30 was added to the wheel design to limit the amount of lateral deflection that could occur during normal vehicle operation. The use of a projection enables the cross-sectional thickness of the disk 14 to be minimized. Preferably, the projection 30 extends to within a distance E of 0.25 mm of the full extension of the sleeve 20. The projection's ability to limit deflection is a function of its proximity to the hub 50. If the projection 30 is too close to the hub 50 it can become heat damaged but if placed too far from the hub 50 the amount of deflection may be unacceptable resulting in cracks in the disk 14 in proximity of the sleeve attachment. The use of projections 30 to limit deflection is optional. Alternatively, it is possible to increase the lateral stiffness of the disk by increasing the thickness of the disk or by adding stiffening ribs.

FIGS. 6, 7, 8, 8A and 9 show enlarged views of the sleeve inserted through the disk. In each of FIGS. 6, 7, 8, 8A it can be observed that the sleeves have annular grooves. Groove 23 is located where the flange 22 joins the sleeve and a second 25 groove on the outer surface of the sleeve is spaced approximately centered within the thickness of the disk 14. The groove 23 at the flange 22 is provided to insure that the flange 22 fully seats on the outerside 15 of the disk 14. Alternatively this groove on the sleeve 20 could be eliminated and the disk 14 could be chamfered at the outerside 15 to insure full seating of the sleeve flange. The second groove 25 shown centered on the disk cross-sectional thickness is provided to assist in securing the sleeve 20 to the rim 12. The sleeves 20 are press fit into the hole 16 upon assembly. The use of an adhesive is considered unnecessary but is optional. The second groove 25 insures that if the wheel is overheated the plastic will flow into the groove 25 creating a mechanical lock. Alternatively if the sleeves are insert molded into the wheel as shown in FIG. 8A the grooves provide a mechanical means to secure the sleeves.

In use the sleeves 20 are captively held by the stud 52 and the nut 54. The need to insure that the sleeves stay attached to the wheel is of concern only when the wheel assembly 10 is not mounted on a vehicle.

In FIG. 9 an alternative sleeve construction is illustrated. The sleeve 200 is actually two separate flanged components 201, 202.

As FIG. 9 illustrates, a number of alternative sleeve designs are possible. The shape and construction of the sleeve can be widely varied. The rim and disk design can also be altered in a variety of ways.

The plastic wheel 10 preferably is made from a thermoplastic injection molded resin, such as nylon reinforced with glass fibers. The specific materials by the inventors used were Dupont's Zytel 82G33L NC-10 nylon and Schulman's Inc. Schulamid 66GF13 Hi-IMP glass fiber. The sleeve was manufactured utilizing free machining leaded steel, 12 L 14.

The decision to use nylon as the primary material for the wheel was made on the basis of the good impact characteristic and low cost of this material. A variety of alternative plastic materials could be used.

Steel is the preferred material for the sleeves based on cost and heat conduction properties. During development of the plastic wheel, sleeves of Torlon, a polyamide-imide, phenolic, and ceramic coated steel were tested, but overall steel sleeves were superior.

During development of the wheel 10 attempts were made to insulate the plastic wheel from the hub. The use of a thermal insulating pad between the innerside of the disk and the hub was tried. The overall result was that the air gap between the disk and hub provided by the extension of the sleeve was the best insulator. The air gap created a convective heat transfer means and protected the disk from the high hub temperatures.

Experimental testing of the plastic wheel assembly 10 as illustrated in FIG. 1 through 8A was conducted.

Brake heat testing involved supplying full brake pressure on a golf car while running the car at 5 mph. The test included six 500 ft runs and two 1000 ft runs with a 10 minute dwell time at 0 mph between each run. The hub temperatures were measured by taking a pyrometer reading at the stud. Temperatures in excess of 400° F. were reached. Wheel disc temperatures were also measured. To pass this test the wheel had to sustain and support the vehicle load at elevated temperatures.

Additionally the plastic wheel, after being exposed to the brake heat test described above, was tested for dynamic cornering fatigue using a 90° loading method. The test was similar to the SAE J1204 cornering test for wheels of recreational and utility trailer tires.

The plastic wheel was impact tested. The disk area had to withstand impact on the rim portion of the wheel without experiencing cracking of the disk. A load of 676 lb was dropped from a 2 inch height onto the rim flange, the rim being inclined at a 13°-angle.

Additionally a vehicle drop test was conducted wherein a golf car was repeatedly dropped from a height of 36 inches. The disk area was required to withstand this impact without cracking. The plastic wheel according to the present invention experienced no damage.

What is claimed is:

1. A plastic wheel comprising:
   a rim;
   a disk integrally attached to the rim and extending radially inwardly from the rim, the disk having a plurality of holes with sleeves, the holes with sleeves being aligned for attachment of the wheel to a vehicle hub, the sleeves extending axially inwardly through the disk the sleeve contacting the vehicle hub upon assembly causing a spacing of the disk and rim portions of the wheel from direct contact with the hub a distance sufficient to avoid excessive heating of the plastic wheel during normal use.

2. The plastic wheel of claim 1 wherein the disk has an axially inner side with a majority of the surface area of the disk perpendicular to the sleeves and wherein a plurality of the sleeves extend axially beyond the surface area a distance of at least 1.0 mm.

3. The plastic wheel of claim 2 wherein a plurality of sleeves extend axially beyond the surface area a distance between 1.0 to 6.0 mm.

4. The plastic wheel of claim 3 wherein a plurality of sleeves extend beyond the surface area a distance of about 2.5 mm.

5. The plastic wheel of claim 1 wherein the disk at the axially inner side has a plurality of projections extending a distance equal to or less than the distance a plurality of the sleeves extend beyond the axially inner side.

6. The plastic wheel of claim 5 wherein the projections extend from the axially inner side a distance of about 90% of the distance a plurality of the sleeves extend beyond the axially inner side of the disk.

7. The plastic wheel of claim 1 wherein the sleeves are metal.

8. The plastic wheel of claim 7 wherein the sleeves are steel.

9. The plastic wheel of claim 2 wherein the sleeves, at an end opposite the axially inner extension of each sleeve, have a conically tapered inner surface.

10. The plastic wheel of claim 2 wherein the sleeves, at an end opposite the axially inner extension of each sleeve, includes a flange.

11. The plastic wheel of claim 2 wherein the sleeves respectively include an outer surface with an annular groove.

12. The plastic wheel of claim 11 wherein the groove is approximately centered within the thickness of the disk.

13. The plastic wheel of claim 10 wherein the disk holes are chamfered or radiused at an axially outer side of the disk.

14. The plastic wheel of claim 10 wherein the sleeves respectively include an annular groove where the flange joins the sleeve.

15. The plastic wheel of claim 1 wherein the plastic wheel is made from a thermoplastic injection molded resin.

16. The plastic wheel of claim 15 wherein the thermoplastic injection molded resin is nylon reinforced with glass fibers.

17. The plastic wheel of claim 5 wherein the projection extends to within a distance E of 0.25 mm of the full extension of the sleeve and limits the amount of lateral deflection of the wheel.

18. The plastic wheel of claim 1 wherein the wheel is adapted to fit over the studs of a golf car hub.

* * * * *